United States Patent
Armstrong (10) Patent No.: US 7,834,760 B2
(45) Date of Patent: Nov. 16, 2010

(54) SYSTEM AND METHOD FOR LOCATING AN INDIVIDUAL

(76) Inventor: Keith C. Armstrong, 22056 Colony Dr., Boca Raton, FL (US) 33433

(*) Notice: Subject to any disclaimer, the term of this patent is extended or adjusted under 35 U.S.C. 154(b) by 0 days.

(21) Appl. No.: 12/645,594

(22) Filed: Dec. 23, 2009

(65) Prior Publication Data
US 2010/0109865 A1  May 6, 2010

Related U.S. Application Data

(63) Continuation-in-part of application No. 11/812,666, filed on Jun. 20, 2007, now abandoned.

(51) Int. Cl.
G08B 1/08 (2006.01)
G01S 19/38 (2010.01)
G01C 21/00 (2006.01)

(52) U.S. Cl. ............ 340/539.13; 342/357.21; 701/207

(58) Field of Classification Search ............ 340/539.13; 342/357.21; 701/207
See application file for complete search history.

(56) References Cited

U.S. PATENT DOCUMENTS

| | | | |
|---|---|---|---|
| 3,735,503 A | 5/1973 | Dow et al. | |
| 4,317,049 A | 2/1982 | Schweppe | |
| 4,672,967 A | 6/1987 | Smith | |
| 4,679,559 A | 7/1987 | Jefferts | |
| 4,730,188 A | 3/1988 | Milheiser | |
| 4,975,707 A * | 12/1990 | Smith | 342/357.48 |
| 5,211,129 A | 5/1993 | Taylor et al. | |
| 5,414,432 A * | 5/1995 | Penny et al. | 342/357.59 |
| 5,629,678 A | 5/1997 | Gargano et al. | |
| 5,716,407 A | 2/1998 | Knapp et al. | |
| 5,725,578 A | 3/1998 | Knapp et al. | |
| 5,742,233 A * | 4/1998 | Hoffman et al. | 340/573.1 |
| 5,742,237 A | 4/1998 | Bledsoe | |
| 5,798,693 A | 8/1998 | Engellenner | |
| 5,900,817 A | 5/1999 | Olmassakian | |
| 5,963,132 A | 10/1999 | Yoakum | |
| 5,977,431 A | 11/1999 | Knapp et al. | |
| 6,011,510 A * | 1/2000 | Yee et al. | 342/357.55 |
| 6,014,080 A * | 1/2000 | Layson, Jr. | 340/573.1 |
| 6,031,460 A | 2/2000 | Banks | |
| 6,040,774 A | 3/2000 | Schepps | |
| 6,083,248 A * | 7/2000 | Thompson | 607/30 |
| 6,317,049 B1 * | 11/2001 | Toubia et al. | 340/573.4 |
| 6,320,535 B1 * | 11/2001 | Hillman et al. | 342/357.31 |
| 6,347,281 B1 | 2/2002 | Litzsinger et al. | |
| 6,373,430 B1 * | 4/2002 | Beason et al. | 342/357.34 |
| 6,414,629 B1 | 7/2002 | Curcio | |
| 6,567,044 B2 * | 5/2003 | Carroll | 342/465 |
| 6,700,493 B1 | 3/2004 | Robinson | |

(Continued)

Primary Examiner—Daniel Wu
Assistant Examiner—John F Mortell
(74) Attorney, Agent, or Firm—Blank Rome LLP (57) ABSTRACT

A system for locating an individual includes a chip with a unique code, a monitor with the unique code, a monitoring station in communication with the monitor, a satellite communication station in communication with the monitoring station, and satellites in communication with the satellite communication station. The chip is implantable in the individual. The satellites transmit a search signal over a search area of predetermined size. The search area is increased until the chip is located. The search signals from the satellites form triangulation data. Location data is formed from the triangulation data and transmitted to the monitor.

18 Claims, 3 Drawing Sheets

U.S. PATENT DOCUMENTS

| | | |
|---|---|---|
| 6,705,522 B2 | 3/2004 | Gershman et al. |
| 6,735,503 B2 * | 5/2004 | Ames .......................... 701/29 |
| 6,754,472 B1 | 6/2004 | Williams et al. |
| 6,819,258 B1 * | 11/2004 | Brown ................... 340/825.49 |
| 6,838,998 B1 | 1/2005 | Brown et al. |
| 6,847,892 B2 | 1/2005 | Zhou et al. |
| 6,888,464 B1 | 5/2005 | Maloney |
| 6,900,731 B2 | 5/2005 | Kreiner et al. |
| 7,076,441 B2 | 7/2006 | Hind et al. |
| 7,554,452 B2 * | 6/2009 | Cole ....................... 340/573.1 |
| 2003/0151501 A1 * | 8/2003 | Teckchandani et al. 340/426.19 |
| 2003/0194993 A1 * | 10/2003 | Fomukong ................ 455/414.1 |
| 2003/0212311 A1 * | 11/2003 | Nova et al. ................... 600/300 |
| 2005/0116811 A1 * | 6/2005 | Eros et al. ................... 340/5.82 |
| 2006/0255935 A1 * | 11/2006 | Scalisi et al. ........... 340/539.13 |
| 2008/0274750 A1 * | 11/2008 | Carlson et al. ........... 455/456.1 |

* cited by examiner

SYSTEM AND METHOD FOR LOCATING AN INDIVIDUAL

CROSS-REFERENCE TO RELATED APPLICATION

This application is a continuation-in-part of U.S. patent application Ser. No. 11/812,666, filed Jun. 20, 2007, entitled "A System and A Method for Locating an Individual" by Keith C. Armstrong, the entire disclosure of which is incorporated herein by reference.

FIELD OF THE INVENTION

The present invention relates to locating systems. In particular, the present invention relates to a system for locating an individual using an implantable chip and satellites to determine the position of the chip.

BACKGROUND OF THE INVENTION

The ability to locate and track an individual can be vital and crucial. For instance, approximately 800,000 children are reported missing in the United States every year. As the population increases, more children are expected to be reported missing. Another example involves individuals traveling abroad. In politically volatile regions of the world, individuals, such as businessmen and contractors, are susceptible to kidnapping and may be held hostage for ransom. Finally, soldiers in hostile territory could be captured and held secretly.

As a result, many systems for tracking and locating individuals have been developed. However, prior systems or methods have drawbacks. Certain prior systems and methods are designed to locate an individual only within a limited area, such as U.S. Pat. No. 6,700,493 to Robinson, entitled "Method, Apparatus and System for Tracking, Locating and Monitoring an Object or Individual." Other systems and methods are expensive because specifically-built components must be used with the system or method, such as U.S. Pat. No. 6,031,460 to Banks, entitled "Child Locating System."

Thus, there is a need for a locating system and method that operates over an expansive area but is relatively inexpensive to manufacture because it uses readily available components. Although several different systems and methods have been proposed, it can be appreciated that there exists a continuing need for a new and improved system and method for locating an individual.

SUMMARY OF THE INVENTION

Accordingly, it is an aspect of the present invention to provide a system and a method for locating an individual that operates over an expansive area and uses readily available components.

One embodiment of the present invention provides a system for locating an individual. The system for locating the individual includes a chip with a unique code, a monitor with the unique code, a monitoring station in communication with the monitor, a satellite communication station in communication with the monitoring station, and satellites in communication with the satellite communication station. The chip is associated with the individual. The monitor transmits a locate signal with the unique code and receiving location data. The monitoring station receives the locate signal with the unique code and thereafter transmits a relayed locate signal with the unique code. The satellite communication station receives the relayed located signal with the unique code and thereafter transmits an initiate search signal with the unique code. The satellite communication station also forms the location data after receiving triangulation data and transmits the location data to the monitor. The satellites transmit a search signal upon receiving the initiate search command. The search signal is transmitted over a search area of predetermined size to locate the chip with the unique code received by the satellites, and the search area is increased until the chip is located. The search signals from the satellites form the triangulation data.

Another embodiment of the present invention provides a method of locating an individual. The method begins with assigning a unique code to a chip. Next, the chip is implanted in the individual. Next, a monitor is provided with the unique code. The monitor is capable of transmitting a locate signal with the unique code when a user wants to locate the individual. Next, a monitoring station is provided in communication with the monitor. The monitoring station transmits a relayed locate signal with the unique code after receiving the locate signal and the unique code. Next, a satellite communication station is provided. The satellite communication station is capable of transmitting an initiate search signal after receiving the relayed locate signal. Next, satellites are provided in communication with the satellite communication station. Each of the satellites is capable of transmitting a search signal after receiving the initiate search signal with the unique code. The search signal is transmitted over a search area of predetermined size to locate the chip with the unique code received by the satellites. Each of the satellites are programmed to increase the search area until the chip is located. Next, triangulation data is formed from the search signals. Then, location data is formed from the triangulation data, and the location data is transmitted to the monitor. Finally, the location data is displayed on the monitor.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
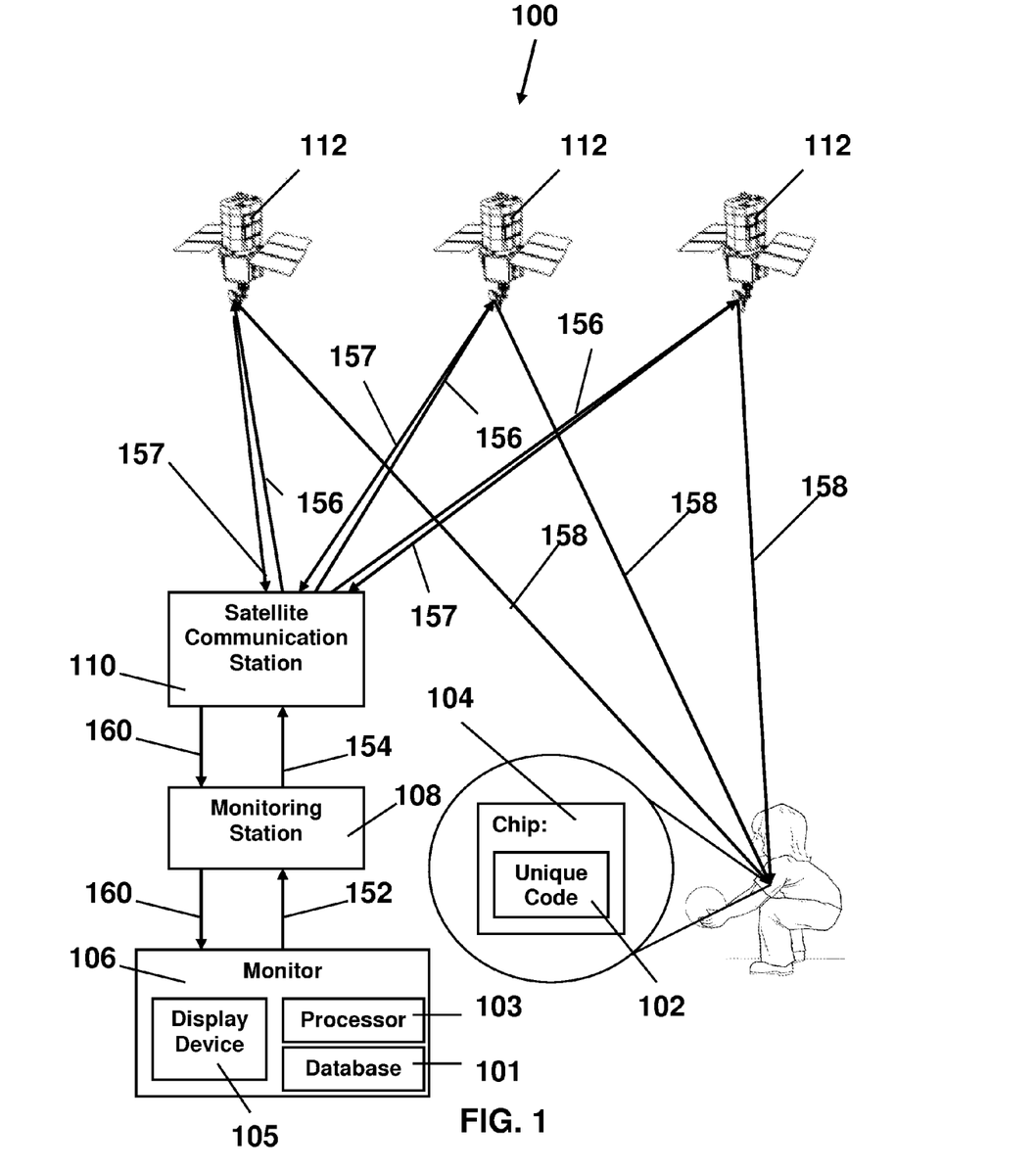
FIG. 1 is a schematic block diagram illustrating a system for locating an individual according to an embodiment of the present invention.
Figure 2:
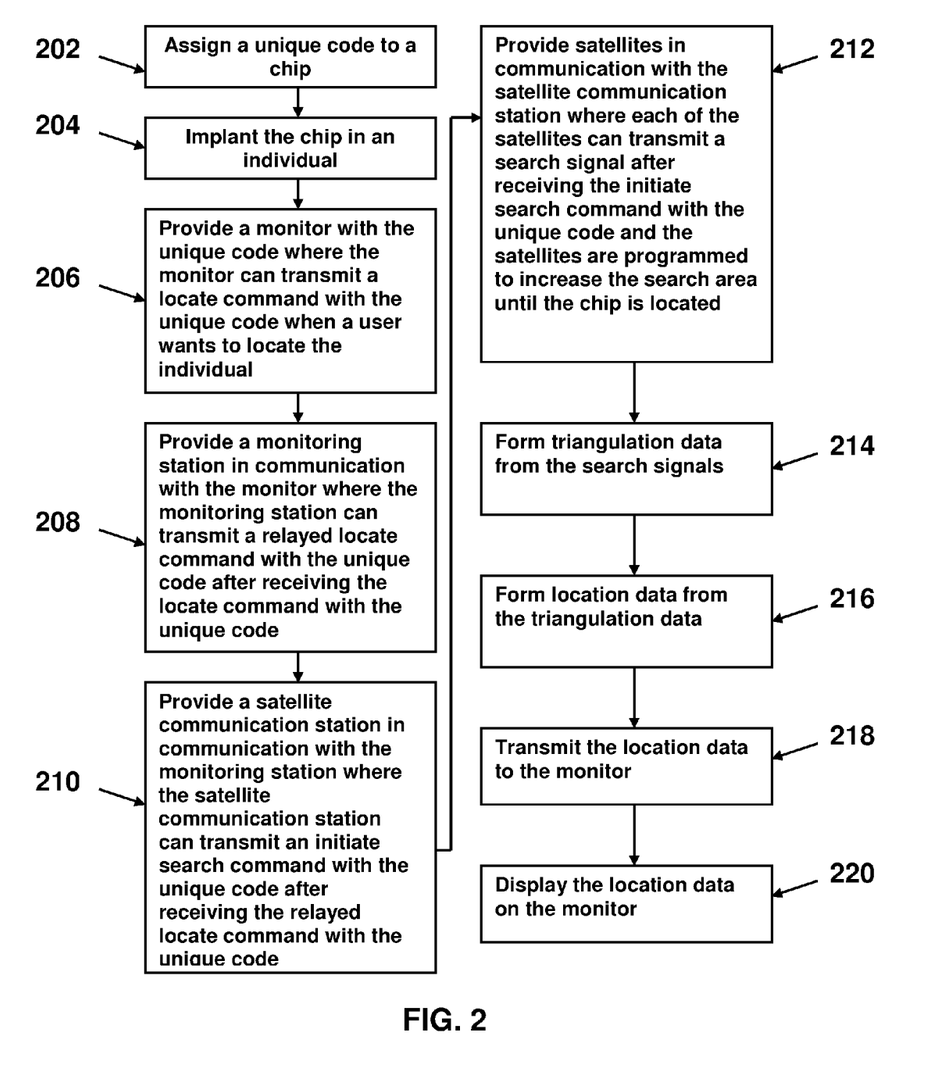
FIG. 2 is a flow chart illustrating the steps of a method for locating an individual according to an embodiment of the present invention.

Referring to FIGS. 1 and 2, the present invention relates to a system and a method for locating an individual. The system and the method for locating the individual operates over an expansive area and uses readily available components.

Referring to FIG. 1, a schematic block diagram of the system 100 for locating the individual is shown. The system for locating an individual includes a unique code 102, a chip 104, a monitor 106, a monitoring station 108, a satellite communication station 110, and satellites 112.

The unique code 102 is electronically disposed on the chip 104. The unique code 102 may be an electronic code; a computer-recognizable code, such as binary, hexadecimal, or other similar computer codes; or any combination of the aforementioned. The unique code 102 may be programmed onto the chip 104, hardwired as part of the chip 104, or made electronically part of the chip 104 by other similar methods.

The chip 104 is preferably a sterilized implantable chip implanted into an individual. The individual who receives the chip 104 may be a child, a business executive, a contractor, a soldier, or anyone else who may become missing or be secretly held. Preferably, the chip 104 is implanted in the upper back of the arm or in the upper back of the individual and can later be removed. The chip 104 may be a semiconductor chip, a radio frequency identification chip, a transceiver, or some other similar device.

When a user wants the system 100 to locate the individual, the user uses the monitor 106. Preferably, the monitor 106 is portable, and more preferably, the monitor 106 is handheld. The unique code 102 is also electronically disposed in the monitor 106 such as by, but not limited to, programming onto the monitor 106, hardwired as part of the monitor 106, or made electronically part of the monitor 106 by other similar methods. When the user uses the monitor 106 to initiate the system 100, the monitor 106 transmits a locate signal 152 with the unique code 102 to the monitoring station 108. The monitor 106 can transmit the locate signal 152 with the unique code by electromagnetic signals, such as, but not limited to, radiofrequency waves or by cellular phone signals, such as, but not limited to, email, short messaging service ("SMS"), enhanced messaging service ("EMS"), multimedia messaging service ("MMS"), and other similar signals. The locate signal 152 with the unique code are preferably transmitted by a cellular phone signal, such as, but not limited to SMS message, EMS message, MMS message, email, or other similar cellular phone signals. When the monitor 106 is using cellular phone signals, the monitor 106 can be a cellular phone, personal digital assistant ("PDA"), email device, data transmitter, or other similar device using cellular phone signals. The monitor 106 can also include maps to display the location of the chip 104 implanted in the individual. In one embodiment, the monitor 106 can include a processor 103, a display device 105, and a database 101 with maps for displaying on the display device 105. Alternatively, the map can be provided to the monitor 106. The monitor 106 can be configured to receive an audio-visual file from a remote web server by email, MMS message, and other similar transmissions for providing map data. Preferably, the map can be electronically scrolled.

The monitoring station 108 is in communication with the monitor 106. The monitoring station 108 is preferably near the user or the monitor 106. The monitoring station 108 can be configured to receive the locate signal 152 from monitor 106 by email, SMS message, EMS message, MMS message, or other similar transmissions. The monitoring station 108 is preferably configured to receive the locate signal 152 by cellular phone signal. The monitoring station 108 is also in communication with the satellite communication station 110. Once the monitoring station 108 receives the locate signal 152 from the monitor 106, the monitoring station 108 transmits a relayed locate signal 154 with the unique code to the satellite communication station 110. The monitoring station 108 boosts the power of the locate signal 152 to form the relayed locate signal 154. The monitoring station 108 boosts the power of the locate signal 152 by electronic amplification and other similar methods. The relayed locate signal 154 should be powerful enough to be transmitted to the satellite communication station 110. The monitoring station 108 can transmit the relayed locate signal 154 with the unique code by electromagnetic signals, such as, but not limited to, radiofrequency waves or by cellular phone signals, such as, but not limited to, email, SMS message, EMS message, MMS message, and other similar signals. The monitoring station 108 may be a station specifically provided for the system, a third-party relaying service, or any other similar mechanism for relaying a nearby signal to a distant receiver. Preferably, the monitoring station 108 is located where a cell phone signal can be sent from the monitoring station 108 to the satellite communication station 110.

Upon receiving the relayed locate signal 154 with the unique code, the satellite communication station 110 transmits an initiate search signal 156 with the unique code to the satellites 112. The satellite communication station 110 receives the relayed locate signal 154 and transmits the initiate search signal 156. The initiate search signal 156 is preferably an electromagnetic signal, such as, but not limited to, radiofrequency waves or a cellular phone signal, such as, but not limited to, email, SMS message, EMS message, MMS message, and other similar signals. The satellite communication station 110 may be near the monitoring station 108. The satellite communication station 110 can also be a part of the monitoring station 108.

When the satellites 112 receive the initiate search signal 156 with the unique code, preferably three of the satellites 112 transmit a search signal 158. The satellites 112 transmit the search signal 158 by electromagnetic emissions or other suitable methods. The search signal 158 is transmitted over a search area of predetermined size to locate the chip 104 with the unique code 102 received by the satellites 112. Preferably, the search area initially has a diameter of five miles. When the chip 104 receives the search signal 158, it preferably transmits a response signal back to the satellite communication station 110 thru satellite 112 which then knows that chip 104 has been located in the location to which the respective satellite was transmitting. For instance, the satellite 112 adds its own identifying information to the response signal from the chip 104. If the chip 104 with the unique code 102 received by the satellites 112 is not located in the initial search area, then at least one satellite 112 incrementally expands the search area of the search signal 158. Preferably, programming of the satellite 112 causes it to incrementally expand the search area.

The unique code 102 is located when the search signal 156 makes electronic contact with the unique code 102. The search signal 156 can make electronic contact with the unique code 102 when the chip 104 receives the search signal 156. Alternatively, electronic contact with the unique code 102 can be made when the chip 104 sends a signal in response to the search signal 156.

If the chip 104 with the unique code 102 received by the satellites 112 is still not located in the search area, then the satellites 112 continue to incrementally expand the search area after each set of sweeps until the appropriate chip 104 is located. The satellites 112 can be programmed to expand the search area after a predetermined number of sweeps. Preferably, upon completing ten sweeps of the initial search area without finding the chip 104, the diameter of the search area is increased from five miles to ten miles. If the chip 104 is still not located after another set of sweeps, then the diameter of the search area is preferably incrementally increased to fifteen miles, twenty miles, fifty miles, and one hundred miles until the chip 104 is located. If the chip 104 is still not located, then instructions can be sent to the satellites 112 to expand the search area even further.

When one of the satellites 112 locates the chip 104 with the unique code 102 received by the satellites 112, that satellite 112 communicates the location of the chip 104 to at least two other satellites 112. Communication between satellites 112 is by electromagnetic transmissions or other suitable methods. The at least two other satellites 112 direct their search signals 158 substantially near the location of the chip 104 with that unique code 102. The satellites 112 are preferably programmed to direct their search signals 158 towards the location of the chip 104 upon receipt of the location of the chip 104. Based on the angles of the search signals 158, triangulation data 157 is formed. The triangulation data 157 is preferably formed from the angles of the search signals 158 relative to the satellites 112 or other suitable reference. Preferably, the triangulation data 157 is formed by software on the satellite. Afterwards, the satellites 112 transmit triangulation data 157 for the chip 104 with the unique code 102 received by the satellites 112 to the satellite communication station 110. The satellite communication station 110 forms location data 160 from the triangulation data 157. Preferably, a computer located near or in communication with the satellite communication station 110 forms the location data 160 from the triangulation data 157. Also, the location data 160 preferably includes a longitude and a latitude of the location of the chip 104 with the unique code 102.

The satellites 112 may be manufactured specifically for use with the system 100. The transceiver portion would be programmed to transmit the search signal 158 upon receiving the initiate search signal 156 with the unique code 102 and to expand the search area of the search signal 158 until the chip 104 with the matching unique code 102 is located. The transceiver portion would also be programmed to send data 157 once the chip 104 with the matching unique code 102 is located.

The satellite communication station 110 sends the location data 160 to the monitor 106 with the matching unique code 102. The satellite communication station 110 can send the location data 160 to the monitor 106 by electromagnetic signals, such as, but not limited to, radiofrequency waves or by cellular phone signals, such as, but not limited to, email, SMS message, EMS message, MMS message, and other similar signals. Because of the unique code 102 electronically disposed in the monitor 102, the satellite communication station 110 sends the location data 160 to the appropriate monitor 106.

After receiving the location data 160, the monitor 106 displays the location data 160. Preferably the location data 160 is displayed on a map on the display device 105. The location data 160 may be displayed as merely the longitude and latitude of the chip 104, an arrow pointing in the direction of the chip 104 with a distance to the chip 104, or another suitable method for leading the user to the chip 104 with the unique code 102 on the display device 105.

The satellite communication station 110 then transmits the location data 160 to the monitoring station 108. The location data 160 can be transmitted by electromagnetic signals, such as, but not limited to, radiofrequency waves or by cellular phone signals, such as, but not limited to, email, SMS message, EMS message, MMS message, and other similar signals.

The monitoring station 108 then relays the location data 160 to the monitor 106. The monitoring station 108 transmits the location data by electromagnetic signals, such as, but not limited to, radiofrequency waves or cellular phone signals, such as, but not limited to, email, SMS message, EMS message, MMS message, and other similar signals.

Referring to FIG. 2, a flow diagram showing a method for locating an individual is shown. First, a unique code 102 is assigned to a chip 104, step 202. Then, the chip 104 is implanted in the individual, step 204. Next, a monitor 106 is provided with the unique code 102, step 206. The monitor 106 is capable of transmitting a locate signal 152 with the unique code when a user wants to locate the individual. Next, a monitoring station 108 in communication with the monitor 106 is provided, step 208. The monitoring station 108 transmits a relayed locate signal 154 with the unique code after receiving the locate signal 152 with the unique code from the monitor 106. Next, a satellite communication station 110 is provided, step 210. The satellite communication station 110 is in communication with the monitoring station 108 and can transmit an initiate search signal 156 after receiving the relayed locate signal 154. Next, satellites 112 in communication with the satellite communication station 110 are provided, step 212.

Each of the satellites 112 transmits a search signal 158 within a search area of predetermined size after receiving the initiate search signal 156 with the unique code. Each of the satellites 112 is programmed to increase the search area until the chip 104 with the corresponding unique code 102 is located. Preferably, the search area initially has a grid diameter of five square miles. Upon completing a predetermined number of sweeps of the initial search area without finding the chip 104, the diameter of the search area is increased. Preferably, the diameter of the search area is increased from five miles to ten miles. If the chip 104 is still not located after another set of sweeps, then the diameter of the search area is preferably incrementally increased to fifteen miles, twenty miles, fifty miles, and one hundred miles after each set of sweeps until the chip 104 is located. If the chip 104 is still not located, then instructions can be sent to the satellites 112 to expand the search area even further.

Next, triangulation data 157 is formed from the search signals 158, step 214. Then, location data 160 is formed from the triangulation data 157, step 216, and the location data 160 is transmitted to the monitor 106 with the unique code 102, step 218. Finally, the location data 160 is displayed on the monitor 106, step 220.

As apparent from the above description, the present invention provides a system and a method for locating an individual. The system and the method operates an expansive area for searching because satellites overhead can search a large search area. Also, the system and method uses readily available parts such as, but not limited to, cellular phones, PDA's, MMS messages, and satellites.

Figure 3:
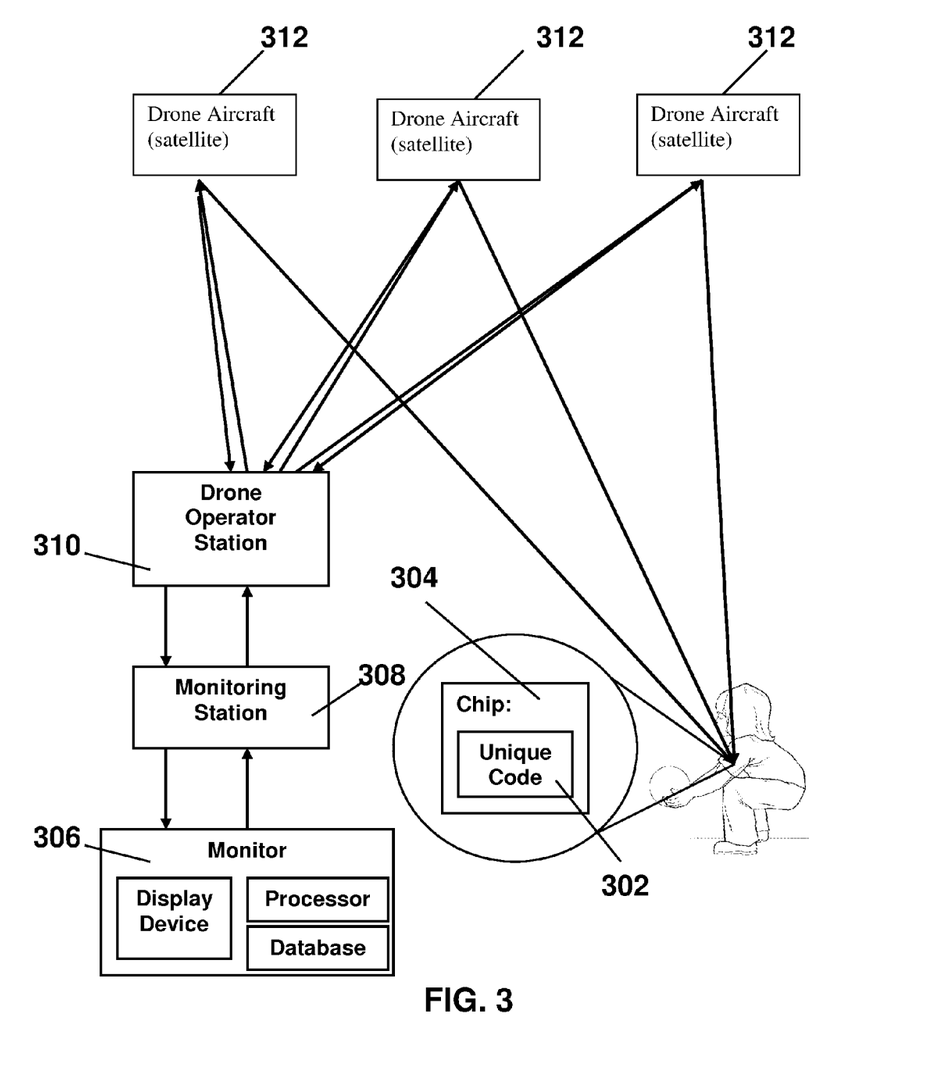
FIG. 3 is a schematic block diagram illustrating a system for locating an individual according to another embodiment of the present invention.

Turning to FIG. 3, an alternative preferred embodiment of the invention is shown. Here, the chip 304 having a unique code 302, the portable monitor 306 and the Monitoring Station 308, are similar to those shown and described with respect to FIGS. 1 and 2. However, in FIG. 3, the Satellite Communication Station 110 has been replaced with a remote communication station, preferably shown as a Drone Operator Station 310. In addition, the satellites 112 have been replaced with a remote communication device, preferably shown as a Drone Aircraft 312. The Drone Aircraft 312 includes a processor, transmitter and receiver, and may also include other related hardware, such as memory.

The chip 304 which is implanted in the child or person, preferably comprises a passive radio frequency identification (RFID) transponder encased in the chip. The transponder is an intrinsic part of the RFID. The entire RFID is about the same dimension and depth of a postage stamp, so that it can be easily implanted in the person. Because the transponder is completely passive, no electrical current is contained in the chip, and it does not require any local power (such as a battery) to operate. By eliminating the need for a battery, the transponder remains small and the transponder need not be removed in order to replace the battery. In addition, the passive transponder is completely non-toxic, unlike chips containing batteries, and is difficult to visually detect. The passive transponder becomes active when it receives a properly tuned signal from an RFID transmitter, and then converts that signal to electrical energy. The transponder is completely inert until it receives the interrogation signal. Once the transponder (transmitter/receiver) receives the interrogation signal, it converts the RF energy to electrical power which powers the device to transmit a response.

The device has a unique code 302 which corresponds to the unique code stored in the portable monitor 306. Accordingly, once the transponder receives the appropriate interrogation signal, and the signal includes the unique code for that particular transponder, the transponder transmits an "I am here" signal to indicate that it contains that unique code.

The passive transponder can communicate up to approximately 1,500 feet. Accordingly, in accordance with the present embodiment, the chips 304 communicate with one or more mobile RFID transmitter/receivers on drone aircraft 312 which are utilized to locate the transponder 304. The aircraft 312 contain a locator device using Global Positioning Satellite (GPS) or other suitable technology. The drone 312 has a transmitter which transmits an interrogation signal to the transponder 304, and also includes a receiver which receives a coded response (i.e., the "I am here" response signal) from the transponder 304. It should be appreciated, however, that the drone aircraft 312 can be any suitable communication device(s) which can transmit and receive signals to/from a passive transponder. Thus, the drone aircraft 312 can be satellites, including low orbiting satellites, emergency vehicles, or communication towers, which communicate with the chip 304 by RFID or other wireless communication.

The drone can locate the transponder 304 in any suitable manner. For instance, the drone can use a companion GPS capability built into the transponder and the two signals (the "I am here" and the signal strength indicator) from the transponder and the "this is where you are" signal from the GPS. The "this is where you are" signal from the GPS device in the drone aircraft is relayed to the Monitoring Station and copied to the drone operator. When the transponder, in the embedded chip 304, responds to the signal from the transmitter in the drone aircraft, the transceiver on the drone 312 can identify the strength of the response. As the signals are sent out continuously from the transmitter of the drone 312, the responses from the transponder 304 are continuously received by the transceiver at the drone 312. The strength of the responses either increase or decrease, as the drones 312 complete their search grids. As the response strength increases, readings of the strength are transmitted to the monitoring station 308, which translates those readings into an approximate location of the unique code. With two or more drones 312 concentrating on the appropriate location for the unique code, triangulation can determine within a Circular Error of Probability (CEP) of the location of the individual, and a rescue squad can be deployed. Thus, the drone can use that information to generate a map of the surrounding area and pinpoint the subject within the Circular Error of Probability (CEP) of a defined radius to enable the person to be located. Alternatively, those signals can be transmitted from the drone 312 to the drone operator station 310 or to the Monitoring Station 308 to determine the location of the individual and deploy a rescue squad.

The responses received by the transceiver on the drone aircraft 312 are preferably automatically relayed to the Monitoring Station 308. The Monitoring Station 308, in turn, determines the strength of the responses sent by the transponder in the embedded RFID. The Monitoring Station 308 instructs the drone operator of that data, which allows the drone operator to concentrate the drone aircraft in the area closest to the strongest signal responses from the transponder. Accordingly, the drone operator is stationed at the Drone Operator Station 310, which is preferably a mobile unit having at least a processor, transmitter and receiver. The Drone Operator Station 310 is in communication with the drone aircraft 312 and the monitoring station 308. It should be noted, however, that the operations performed by the Monitoring Station 308 can be performed by the Drone Operator Station 310.

The Drone Operator Station 310 determines the area for search in the vicinity of the missing individual's home. The Drone Operator Station 310 is preferably in that area, so that the drone operator can direct the drone or drones to commence specific search grid flights in that immediate area. That may be particularly important where the location is distant from the Monitoring Station 108. The Drone Operator Station 310 includes a processor to implement the functions of the station 310, as well as a transmitter and receiver to communicate with the drone aircraft 312 and the monitoring station 308 or portable monitor 306.

The drone aircraft will preferably fly at an altitude of approximately 1,000 feet (or at an altitude otherwise commensurate with FAA guidelines), in a predetermined grid search pattern. If the person is not located in that grid area, the Drone Operator Station 310 will increase the grid area until contact is achieved. The Drone Operator Station 310 can have one or more unmanned drone aircraft performing searches in adjoining grid patterns at the same time. The drone aircraft 312 includes a signal-strength technology to determine the strength of the signal received from the transponder 304, which in turn assists in the location of the person. The closer the drone comes to the transponder, the stronger the received signal will become from that transponder, alerting the drone operator to concentrate on that location.

Accordingly, when a kidnapping is reported, the portable monitor 306 is used to send the unique code stored in that monitor 306 to the Drone Operator Station 310 via the monitoring station 108. That signal can be sent by cellular phone from the Monitoring Station 308 to the Drone Operator Station 310, so that it does not matter if the drone operator is far (e.g., 50 miles or more) from the Monitoring Station. The cellular message is related by cell phone towers. A locate signal with the unique code is sent from the Drone Operator Station 310 to the drone aircraft 312. The drone 312, in turn, transmits that locate signal as it conducts its search. Once a response signal is received at the drone from the transponder 304, the system can utilize that signal to locate the chip 304. In addition, the drone 312 can retransmit that response signal from the chip 304 to the Drone Operator Station 310, and from there back to the Monitoring Station 308 and the portable monitor 306. The Monitoring Station 308 informs the Drone Operator Station 310 of the results of its determination of the strength of the signals. The Drone Operator Station 310 can then prepare a strategy to concentrate the search in the area of the strongest response signals, which the drone operator then implements.

In the embodiments shown and described, the drone aircraft 312, Drone Operator Station 310, monitoring station 308, and monitor 306 can include a processor which performs the various functions and operations in accordance with the invention. The processor can be, for instance, a personal computer (PC), server or mainframe computer. The processors may also be provided with one or more of a wide variety of components or subsystems including wired or wireless communication links, input devices, monitors, memory or storage devices such as a database. The aircraft 312, stations 310, 308 and monitor 306 further include a transmitter and receiver to enable communication between the various devices.

Accordingly, by providing the drone aircraft 312, the system is able to use a passive transponder 304 to implant in the individual. This is important because the passive transponder is small and is more difficult to detect within the individual. The passive transponder 304 is within communication distance to the drone aircraft 312, and therefore can derive its power from the aircraft and need not have its own power supply. In addition, the passive transponder is not toxic, and therefore is not harmful to the individual.

Accordingly, the invention is able to provide for rapid response to a notice of abduction of an individual, which is critical to any recovery. In the U.S., Monitoring Stations 308 are preferably located across the country, with 5-6 on the Pacific coast, several in the Southwest, 5-6 in those states bordering the Gulf of Mexico, and a number along the Atlantic coastline, with more in New York, Pennsylvania, Ohio, Michigan, and Illinois. Each Monitoring Station 308 will have its own fleet of drone aircraft. Accordingly, immediate reaction to a notice of an abduction, kidnapping or ransom can be implemented.

While a particular embodiment has been chosen to illustrate the invention, it will be understood by those skilled in the art that various changes and modifications can be made therein without departing from the scope of the invention as defined in the appended claims.

What is claimed is:

1. A system for locating individuals, comprising:
   a plurality of implantable chips, each implantable chip comprising a passive radio frequency identification (RFID) transponder encased in each said implantable chip and having one unique code pre-programmed to be stored therein;
   a plurality of portable monitors, each of the plurality of portable monitors having one unique code, for one and only one of the plurality of implantable chips, pre-programmed to be stored therein, each of the plurality of portable monitors retrieving the one unique code, wirelessly transmitting a locate data signal with the one unique code and receiving location data; and
   a drone operator station remote from the plurality of portable monitors in communication with the plurality of portable monitors, the drone operator station receiving the locate data signal with the one unique code and thereafter transmitting an initiate search signal with the unique code, the drone operator station forming the location data after receiving triangulation data and transmitting the location data to the monitor;
   wherein the drone operator station is in communication with a plurality of drone aircraft, each of the plurality of drone aircraft including a transmitter for transmitting a search signal upon receiving the initiate search signal with the unique code, the search signal being transmitted over a search area of predetermined size to locate the chip with the unique code received by the drone aircraft, the search signal incrementally extending the search area until the chip with the unique code received by the drone aircraft is located; and wherein the search signals from the plurality of drone aircraft form the triangulation data.

2. The system for locating an individual according to claim 1, wherein the monitor communicates with a monitoring station by cellular phone signal.

3. The system for locating an individual according to claim 1, wherein the location data is a longitude and latitude of the chip.

4. The system for locating an individual according to claim 1, wherein a plurality of maps is provided in the monitor.

5. The system for locating an individual according to claim 4, wherein the location data is displayed on a map stored in the monitor.

6. The system of claim 1, wherein the search signal is transmitted wirelessly by radiofrequency waves.

7. The system for locating an individual according to claim 1, further comprising a plurality of monitoring stations, each in communication with at least one of the plurality of monitors, the monitoring stations receiving the locate data signal with the unique code and thereafter transmitting a relayed locate data signal with the unique code to the drone operator station.

8. The system of claim 7, wherein the relayed locate data signal is transmitted wireless sly by radiofrequency waves.

9. The system of claim 1, wherein said plurality of implantable chips comprise a plurality of implantable radio frequency identification chips.

10. A method of locating individuals, comprising the steps of:
    assigning a unique code to each one of a plurality of passive implantable chips, each of the plurality of implantable chips comprising a radio frequency identification (RFID) transponder encased in the implantable chip and having one unique code pre-programmed to be stored therein;
    providing a plurality of portable monitors, each monitor having one unique code of one and only one of the plurality of implantable chips pre-programmed to be stored therein, each of the portable monitors wirelessly transmitting a locate data signal with the one unique code when a user wants to locate the individual;
    providing a remote communication station in communication with the portable monitors, the remote communication station capable of transmitting an initiate search signal with the one unique code after receiving the locate data signal with the one unique code, the remote communication station in communication with a plurality of remote communication devices, each of the plurality of remote communication devices capable of transmitting a search signal after receiving the initiate search signal with the unique code, the search signal being transmitted over a search area of predetermined size to locate the chip with the one unique code received by the remote communication devices, each of the plurality of remote communication devices programmed to incrementally extend the search area until the chip is located;
    forming triangulation data from the search signals;
    forming location data from the triangulation data;
    transmitting the location data to the monitor; and
    displaying the location data on the monitor.

11. The method of locating an individual according to claim 10, wherein the monitor communicates with a monitoring station by cellular phone signal.

12. The method of locating an individual according to claim 10, wherein the location data is a longitude and latitude of the chip.

13. The method of locating an individual according to claim 12, further comprising the step of storing a plurality of maps in the monitor.

14. The method of locating an individual according to claim 13, further comprising the step of displaying the location data on one of the plurality of maps stored in the monitor.

15. The method of locating an individual according to claim 10, further comprising the step of providing a plurality of monitoring stations, each in communication with at least one of the plurality of monitors, the monitoring stations transmitting a relayed locate data signal with the unique code to the remote communication station after receiving the locate data signal with the unique code.

16. The method of claim 15, wherein each of the plurality of portable monitors wirelessly transmit the locate data signal by radiofrequency waves with the unique code and receiving location data.

17. The method of claim 10, wherein the plurality of remote communication devices comprise drone aircraft.

18. The method of claim 10, wherein the remote communication devices comprise satellites, and wherein the remote communication station boosts the initiate search signal and transmits the boosted initiate search signal as the search signal.

* * * * *